May 2, 1967

C. F. BACHLE 3,316,888

CYLINDER HEAD CONSTRUCTION

Filed Jan. 15, 1965

INVENTOR.
CARL F. BACHLE
BY
Hauke & Hauke
ATTORNEYS

United States Patent Office 3,316,888
Patented May 2, 1967

3,316,888
CYLINDER HEAD CONSTRUCTION
Carl F. Bachle, Grosse Pointe, Mich., assignor to Continental Aviation and Engineering Corporation, Detroit, Mich., a corporation of Virginia
Filed Jan. 15, 1965, Ser. No. 425,731
4 Claims. (Cl. 123—41.69)

The present invention relates to internal combustion engines, particularly to an improved cylinder head construction for such an engine and its method of fabrication, and more particularly to a new unitary head and cylinder structure provided with separately fabricated valve port structure secured thereto.

In recent years manufacturers of internal combustion engines have turned more and more to aluminum because of its relatively light weight and its more effective heat conducting properties. It has been found, however, that metals such as aluminum are not satisfactory for some portions of the engine which are subjected to intense combustion heat because of the reduction in strength at high temperatures.

It is an object then of the present invention to provide an improved cylinder head construction which utilizes aluminum or the like in combination with metals having a greater thermal resistance in those portions of the cylinder head subjected to combustion heat, particularly the cylinder wall and valve areas.

Still another object of the present invention is to increase the efficiency of high temperature internal combustion engines by providing a light weight, unitary head and cylinder structure for such an engine.

It is yet another object of the present invention to reduce the cost of manufacturing internal combustion engines by providing a unitary head and cylinder structure and separately fabricated valve structure which are adapted to be secured together by welding or other means.

It is still another object of the present invention to improve internal combustion engines by providing a unitary head and cylinder construction for such engines comprising a cylindrical member constructed of high temperature material such as steel or the like defining the cylinder walls and combustion chamber, a relatively low temperature material such as aluminum or the like being bonded to the outer portions of the cylindrical member and valve structure of a high temperature material being secured to the head and cylinder structure as by welding.

Figure 1:
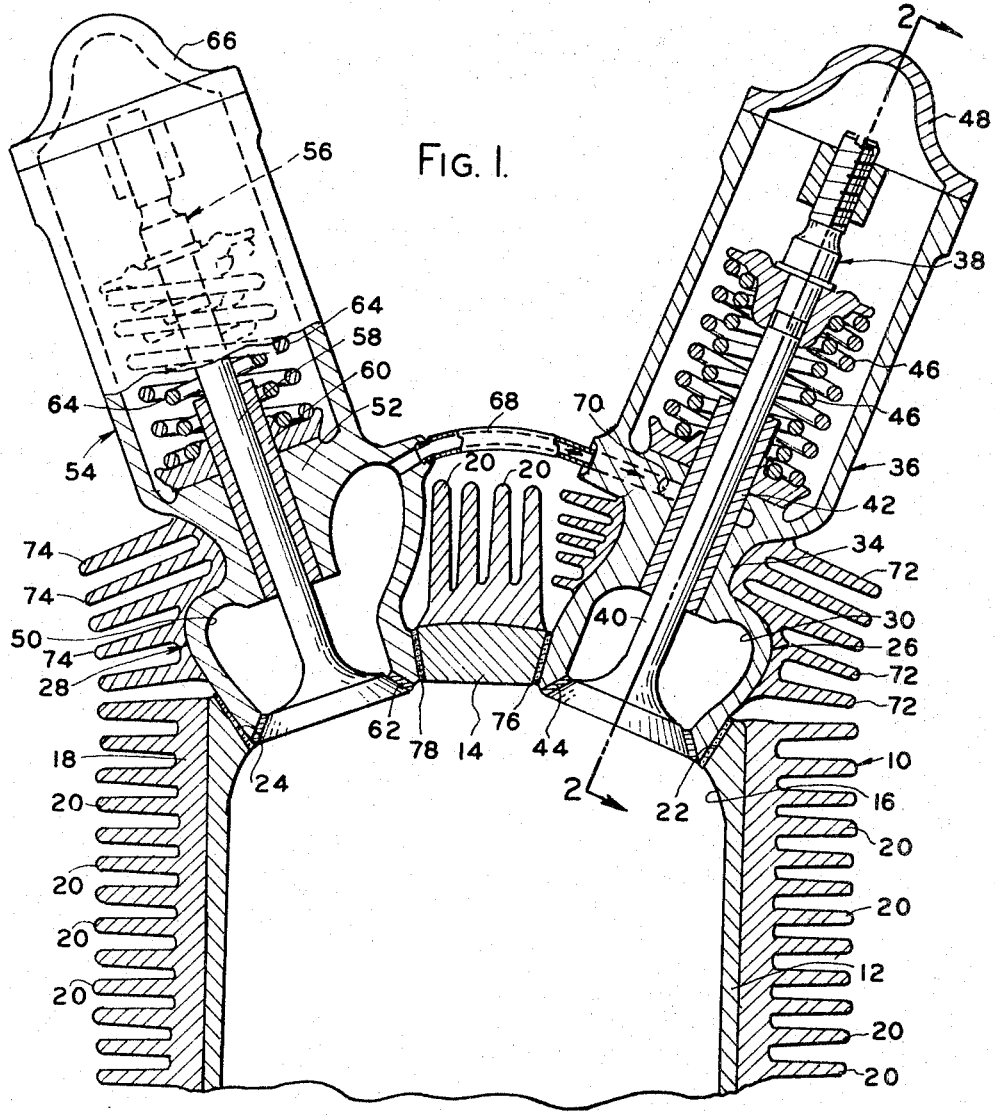
Figure 2:
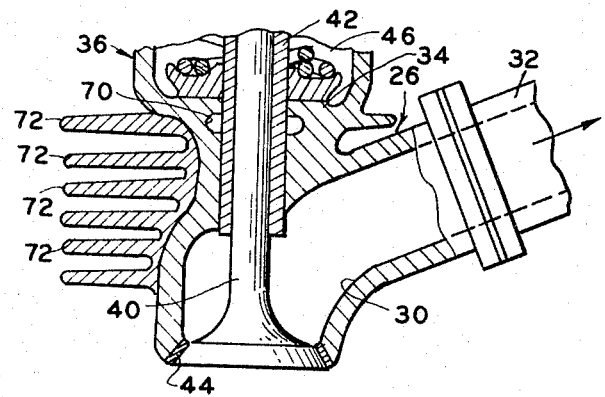

Still further objects and advantages will readily occur to one skilled in the art to which the invention pertains upon reference to the following drawings in which like reference characters refer to like parts throughout the several views and in which FIG. 1 is a fragmentary cross sectional view of an internal combustion engine illustrating a preferred construction of the present invention and in which parts of the engine have been removed for purposes of clarity, and FIG. 2 is a cross sectional view taken substantially on line 2—2 of FIG. 1.

Description

Now referring to the drawings for a more detailed description of the present invention, a preferred unitary head and cylinder structure 10 is illustrated as comprising a cylinder member 12, preferably constructed of a material having a relatively high strength at elevated temperatures such as steel or the like. The cylinder member 12 defines the walls of the cylinder of the engine and is provided with a closed top portion 14 which defines a combustion chamber 16.

A relatively lightweight material 18 of relatively low thermal resistance such as aluminum or the like is bonded to and substantially encompasses the cylinder member 12 as shown. The material 18 is preferably bonded to the cylinder member 12 by any convenient process such as that commonly known in the trade as the Al-Fin process. Cooling fins 20 are provided on the outer surface of the material 18.

A pair of spaced openings 22 and 24 are formed in the material 18 and extend through the top portion 14 of the cylinder member 12 to communicate with the combustion chamber 16. The openings 22 and 24 are adapted to receive an exhaust port structure 26 and an intake port structure 28 respectively and which will be described in greater detail below.

The exhaust port structure 26 is preferably constructed of a metal of a relatively high thermal resistance such as iron or steel and preferably comprises an exhaust passage 30. An exhaust manifold 32 is secured to the exhaust port structure 26 as can best be seen in FIG. 2 and communicates with the exhaust passage 30. A medial boss portion 34 is provided in the exhaust port structure 26 and a rocker arm housing 36 is integrally connected therewith. A rocker arm assembly 38 is carried in the housing 36 and is operably connected to an exhaust valve 40 in the conventional manner. A valve guide 42 is carried in the boss portion 34. A seat ring 44 preferably constructed of a high strength material such as Stellite is carried by the exhaust port structure 26 and provides a seat for the exhaust valve 40. Springs 46 bias the exhaust valve 40 toward a closed position. A cap member 48 is provided for the housing 36.

The intake port structure 28 is preferably constructed of a metal of a relatively high thermal resistance such as iron or steel and preferably comprises an intake passage 50. A medial boss portion 52 is provided in the intake port structure 28 and a rocker arm housing 54 is integrally connected therewith. A rocker arm assembly 56 is carried in the housing 54 and is operably connected with an intake valve 58. The valve 58 is positioned by a guide member 60 carried in the boss portion 52 and seats against a seat member 62 carried in the port structure 28. The seat member 62 is also preferably constructed of a high strength material such as Stellite. Spring members 64 bias the valve 58 toward a closed position and a cap member 66 is provided for the housing 54.

A conduit 68 preferably connects the intake passage 50 to an annular chamber 70 encompassing the exhaust valve guide 42 to provide cooling therefor. The exhaust port structure 26 and the intake port structure 28 are preferably respectively provided with cooling fins 72 and 74 preferably constructed of aluminum or similar material bonded as described above to portions of the outer surfaces thereof. The exhaust port structure 26 and the intake port structure 28 are preferably welded to the head and cylinder structure 10 as at 76 and 78 respectively.

One preferred method for constructing the cylinder head of the present invention is as follows: First the unitary head and cylinder structure 10 is formed by bonding the aluminum or similar material 18 to the steel cylinder members 12 by the Al-Fin or similar process. The cooling fins 20 may then be formed in the material 18. The exhaust port structure 26 and the intake port structure 28 are separately fabricated and are positioned in the openings 22 and 24 respectively. An electron beam is directed toward the mated edges through the open end of the cylinder member 12 at a strength and for a period of time sufficient to weld the structures 26 and 28 in position.

The construction of the present invention provides a unitary head and cylinder construction in which light weight thermal conductive metals such as aluminum can be used to the utmost advantage and yet in those areas such as the combustion chamber and the valve port areas which are subjected to intense combustion heat, more heat resistive materials such as steel or the like can be used. The provision of separately fabricated valve structures substantially reduces manufacturing costs and permits different materials to be used in the exhaust port as opposed to the cylinder barrel.

Although it has been preferred to illustrate the present invention as a cylinder head construction for an air cooled engine, it is apparent that its use is not intended to be limited to such engines.

It is also apparent that although I have described but one embodiment of the present invention, other changes and modifications can be made without departing from the spirit of the invention as expressed by the appended claims.

I claim:
1. A cylinder head for an internal combustion engine comprising;
 (a) a lower section,
 (b) said lower section defining a combustion chamber,
 (c) an exhaust port receiving opening and an intake port receiving opening being provided in said lower section and communicating with said combustion chamber,
 (d) an exhaust port structure and an intake port structure carried in said exhaust port receiving opening and said intake port receiving opening respectively,
 (e) said lower section being constructed of a relatively high thermal resistive material defining said combustion chamber and a relatively high thermal conductive material encompassing said first mentioned material,
 (f) said exhaust port structure being constructed of a relatively high thermal resistive material,
 (g) said exhaust port structure being provided with a rocker arm housing connected integrally therewith,
 (h) said housing enclosing a rocker arm assembly and an exhaust valve operable connected therewith, and
 (i) a seat member constructed of a high strength material carried in said exhaust port structure and providing a seat for said exhaust valve.

2. A cylinder head for an internal combustion engine comprising;
 (a) a lower section,
 (b) said lower section defining a combustion chamber,
 (c) an exhaust port receiving opening and an intake port receiving opening being provided in said lower section and communicating with said combustion chamber,
 (d) an exhaust port structure and an intake port structure carried in said exhaust port receiving opening and said intake port receiving opening respectively,
 (e) said lower section being constructed of a relatively high thermal resistive material defining said combustion chamber and a relatively high thermal conductive material encompassing said first mentioned material,
 (f) said intake port structure being constructed of a relatively high thermal resistive material,
 (g) said intake port structure being provided with a rocker arm housing connected integrally therewith,
 (h) said housing enclosing a rocker arm assembly and an intake valve operably connected therewith, and
 (i) a seat member constructed of a high strength material carried in said intake port structure and providing a seat for said intake valve.

3. A cylinder head for an internal combustion engine comprising;
 (a) a unitary lower section comprising a cylindrical member constructed of a relatively high thermal resistive material and a layer of relatively low thermal resistive material encompassing said cylindrical member,
 (b) said cylindrical member having a closed top portion defining a combustion chamber,
 (c) said lower section having an exhaust port receiving opening and an intake port receiving opening communicating with said combustion chamber,
 (d) an exhaust port structure and an intake port structure constructed of relatively high thermal resistive material and carried in said port receiving opening and said intake port receiving opening respectively,
 (e) said exhaust port structure being provided with a rocker arm housing connected integrally therewith and formed of said relatively high thermal resistive material,
 (f) said housing enclosing a rocker arm assembly and an exhaust valve operably connected therewith,
 (g) said layer of relatively low thermal resistive material encompassing said cylindrical member also being bonded to portions of said exhaust port structure and being provided with cooling fins formed therein.

4. A cylinder head for an internal combustion engine comprising;
 (a) a unitary lower section comprising a cylindrical member constructed of a relatively high thermal resistive material and a layer of relatively low thermal resisting material encompassing said cylindrical member,
 (b) said cylindrical member having a closed top portion defining a combustion chamber,
 (c) said lower section having an exhaust port receiving opening and an intake port receiving opening communicating with said combustion chamber,
 (d) an exhaust port structure and an intake port structure constructed of a relatively high thermal resistive material and carried in said port receiving opening and said intake port receiving opening respectively,
 (e) said intake port structure being constructed of a relatively high thermal resistive material and being provided with a rocker arm housing connected integrally therewith, said housing enclosing a rocker arm assembly and an intake valve operably connected therewith,
 (f) said layer of relatively low thermal resistive material encompassing said cylindrical member also being bonded to portions of said intake port structure and being provided with cooling fins formed therein.

References Cited by the Examiner
UNITED STATES PATENTS

| | | | |
|---|---|---|---|
| 1,012,635 | 12/1911 | Harmer. | |
| 1,248,266 | 11/1917 | Coatalen | 123—90 |
| 2,227,933 | 1/1941 | Hersey | 123—41.69 |
| 2,270,990 | 1/1942 | Bachle | 123—41.69 |
| 2,280,660 | 4/1942 | Newcomb | 123—193 X |
| 2,426,438 | 8/1947 | De Pew | 123—90 |
| 2,456,272 | 12/1948 | Gregory | 123—193 |
| 2,600,529 | 6/1952 | Gregory | 123—188 |

MARK NEWMAN, *Primary Examiner.*

A. L. SMITH, *Assistant Examiner.*